United States Patent
Menne et al.

(10) Patent No.: US 9,694,913 B2
(45) Date of Patent: Jul. 4, 2017

(54) AIRCRAFT LED LIGHT UNIT

(71) Applicant: Goodrich Lighting Systems GmbH, Lippstadt (DE)

(72) Inventors: Norbert Menne, Paderborn (DE); Elmar Schrewe, Anröchte-Uelde (DE); Klaus Gierse-Plogmeier, Lippstadt-Garfein (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 116 days.

(21) Appl. No.: 14/446,528

(22) Filed: Jul. 30, 2014

(65) Prior Publication Data
US 2015/0036367 A1  Feb. 5, 2015

(30) Foreign Application Priority Data
Aug. 1, 2013  (EP) .................................. 13178912

(51) Int. Cl.
*B64D 47/02* (2006.01)
*F21V 23/00* (2015.01)
*F21V 29/80* (2015.01)
*F21V 29/89* (2015.01)
*F21W 111/06* (2006.01)
(Continued)

(52) U.S. Cl.
CPC ............ *B64D 47/02* (2013.01); *F21V 23/007* (2013.01); *F21V 29/80* (2015.01); *F21V 29/89* (2015.01); *B64D 2203/00* (2013.01); *F21W 2111/06* (2013.01); *F21Y 2107/60* (2016.08); *F21Y 2115/10* (2016.08)

(58) Field of Classification Search
CPC ... B64D 2203/00; B64D 47/02; F21V 23/007; F21V 29/80; F21V 29/89; F21W 2111/06; F21Y 2101/02; F21Y 2111/008
See application file for complete search history.

(56) References Cited

U.S. PATENT DOCUMENTS 6,483,254 B2 * 11/2002 Vo .......................... B64D 47/06
                                                          315/241 S
7,416,312 B1    8/2008 McDermott
(Continued)

FOREIGN PATENT DOCUMENTS

DE  102007009896   9/2008
EP       0449219  10/1991
(Continued)

OTHER PUBLICATIONS

European Search Report for Application No. 13178912.5-1757, mailed Feb. 4, 2014. 8 pages.

*Primary Examiner* — Peggy Neils
(74) *Attorney, Agent, or Firm* — Cantor Colburn LLP (57) ABSTRACT

An aircraft LED light unit is disclosed that includes a flat electric circuit device having a first main surface, a second main surface and at least one side surface extending between the first main surface and the second main surface, power supply circuitry, disposed in the electric circuit device, at least one heat transport element, disposed in the electric circuit device, and at least one LED. The at least one LED is arranged on the at least one side surface of the electric circuit device, is electrically coupled to the power supply circuitry, and is in heat exchange relationship with the at least one heat transport element.

13 Claims, 3 Drawing Sheets

(51) Int. Cl.
  *F21Y 115/10*  (2016.01)
  *F21Y 107/60*  (2016.01)

(56) References Cited

U.S. PATENT DOCUMENTS

| | | | | |
|---|---|---|---|---|
| 8,985,819 B2* | 3/2015 | Hessling | ................ | B64D 47/06 |
| | | | | 362/247 |
| 2003/0053307 A1* | 3/2003 | Talamo | ................... | E01C 17/00 |
| | | | | 362/153.1 |
| 2010/0084979 A1* | 4/2010 | Burton | ...................... | F21K 9/00 |
| | | | | 315/82 |
| 2011/0107587 A1* | 5/2011 | Kolb | ....................... | F21V 5/046 |
| | | | | 29/592.1 |
| 2012/0268959 A1* | 10/2012 | Barnett | .................. | B64D 47/04 |
| | | | | 362/470 |
| 2013/0234866 A1* | 9/2013 | Vetter | ....................... | B64F 1/20 |
| | | | | 340/953 |
| 2014/0063803 A1* | 3/2014 | Yaphe | ................... | F21V 15/012 |
| | | | | 362/247 |
| 2017/0015436 A1* | 1/2017 | Schoen | ................... | G09F 13/10 |

FOREIGN PATENT DOCUMENTS

| | | |
|---|---|---|
| EP | 1405789 | 4/2004 |
| JP | 2009076250 | 4/2009 |
| WO | 0249917 | 6/2002 |
| WO | 2005124224 | 12/2005 |

* cited by examiner

FIG. 5B ated structure. This
AIRCRAFT LED LIGHT UNIT

CROSS REFERENCE TO RELATED APPLICATIONS

This application claims priority to European Patent Application No. 13 178 912.5 filed Aug. 1, 2013, the entire contents of which is incorporated herein by reference.

FIELD OF TECHNOLOGY

The invention relates to aircraft lighting systems. In particular, it relates to LED light units that may be interior or exterior lights of an aircraft.

BACKGROUND

LED lights have been introduced in the aircraft industry in recent years. Commonly, such LED lights have one or more LED's. Those LED's are mounted to a printed circuit board (PCB) together with the power supply and control circuits. The LED's and the other circuit elements are interconnected by the conductive pathways of the printed circuit board. The space requirements of such present day LED lights have been found insufficient in aircraft applications.

Accordingly, it would be beneficial to provide an aircraft LED light unit that has a higher space efficiency, i.e. that has reduced space requirements for a desired illumination power.

SUMMARY

Exemplary embodiments of the invention include an aircraft LED light unit that comprises a flat electric circuit device having an upper surface, a lower surface and at least one side surface extending between the upper surface and the lower surface, and that further comprises power supply circuitry, disposed in the electric circuit device, at least one heat transport element, disposed in the electric circuit device, and at least one LED. The at least one LED is arranged on the at least one side surface of the electric circuit device, is electrically coupled to the power supply circuitry, and is in heat exchange relationship with the at least one heat transport element.

Providing LED's on side surfaces of an electric circuit allows for a more efficient transport of heat away from the LED's. LED's have a light emission portion with a principal light emission direction. A longitudinal direction of extension of the LED extends from the light emission portion towards an opposite end. This longitudinal direction corresponds largely to the principal light emission direction. LED's have a substantial mechanical extension in this longitudinal direction. Said opposite end of the LED in the longitudinal direction is the place from where the waste heat can be transported away particularly efficiently. It is also referred to as the LED slug. As the LED(s) are arranged on the side surface(s) of the electric circuit device, the waste heat can be transported away from the LED slug directly into the body of the electric circuit device via the heat transport element(s). The whole body of the flat, three-dimensional electric circuit device can be used for an efficient routing of the heat transfer.

The constraints of the printed circuit board, where individual pathways, which are laminated onto a non-conductive substrate, cannot cross each other, do not apply to the electric circuit device, as it extends in three dimensions. The heat transport element(s), which may be conductive wires or plates, as will be explained below, can cross the conductors of the power supply circuitry and/or other heat transport element(s) due to the three-dimensional structure. This allows for using a large volume of the electric circuit device for waste heat transport. This in turn allows for arranging multiple LED's in close proximity to each other. The waste heat can be transported away via the heat transport element(s) without the spatial constraints of the printed circuit board. Accordingly, a high LED density can be achieved on the side surface(s) of the electric circuit device.

This leads to substantial space reductions, as compared to previous aircraft LED light units. In particular, the inventive approach allows for a reduction of the total volume of an exemplary aircraft LED light unit by about two thirds, as compared to previous approaches. Together with the space reduction, the inventive approach also allows for a weight reduction. The weight reduction may be in the range of 50% for an exemplary aircraft LED light unit, as compared to previous approaches. As LED's have a high illumination capacity per power consumption, the inventive aircraft LED light units constitute a very favorable compromise between space requirements (area and volume), weight, illumination capacity and power consumption.

According to a particular embodiment, the aircraft LED light unit comprises a plurality of LED's, arranged on the at least one side surface of the electric circuit device. The plurality of LED's may be provided in the aircraft LED light unit with a higher LED density, as compared to the prior art. As explained above, this is due to the added degrees of freedom in the flat electric circuit device and the provision of the heat transport elements therein. In a particular embodiment, the plurality of LED's may be positioned adjacent to each other. Such adjacent positioning is made possible by the side-mounting of the LED's. A corresponding adjacent positioning would not be possible by the conventional mounting of the LED's on the top side of a printed circuit board. It is explicitly pointed out, however, that the at least one LED may also be exactly one LED. The side-mounting of the exactly one LED is also beneficial as compared to previous approaches, because the power supply circuitry and the heat transport element can be arranged with greater flexibility in the electric circuit device.

The principal light emission direction(s) of the at least one LED may be substantially perpendicular to the at least one side surface. In this way, the light emission distribution is well defined with respect to the electric circuit device, whose orientation in the aircraft LED light unit and with respect to the aircraft translates to the orientation of the light emission direction in a non-complex manner. Also, the portion of the LED where the waste heat is released extends substantially perpendicular to the at least one side surface into the electric circuit device. In this way, the transporting away of the waste heat may already start some distance into the electric circuit device.

The flat electric circuit device is a three-dimensional structure. It has substantial extensions in all three dimensions. As it holds at least the power supply circuitry and the at least one heat transport element, it can also be referred to as a holding structure or support structure. It also provides support for the at least one LED. The three-dimensional structure can also be referred to as the body of the electric circuit device, whose volume is available for routing the power supply circuitry and the heat transport element(s).

The terms "first main surface" and "second main surface" refer to the surfaces of the flat electric circuit device that have a greater lateral extension than the at least one side surface (at their respective locations of smallest lateral extension). In the example of a flat cuboid, the first and second main surfaces are the two surfaces with the largest area. When the flat electric circuit device is placed on a table by itself, it has the smallest height extension when one of the first and second main surfaces comes to lie on the table. Therefore, the first and second main surfaces may also be referred to as "upper surface" and "lower surface", no matter how they are eventually oriented in the finished aircraft LED light unit. In the finished aircraft LED light unit, the electric circuit device is commonly placed in a housing.

The first and second main surfaces may be substantially plane surfaces. However, they may also have grooves, channels, ridges and the like, depending on the desired geometry of the electric circuit device. The first and second main surfaces may also be non-continuous. For example, a hole may run through the electric circuit device from the first main surface to the second main surface, provided for mounting the electric circuit device on a pole-like structure. The first and second main surfaces may be parallel with respect to each other. In this way, a constant distance between the first and second side surfaces is present throughout the electric circuit device. However, it is also possible that the first and second main surfaces are inclined with respect to each other. The electric circuit device may then have a wedge-like structure.

The electric circuit device may have a large variety of geometries. In an exemplary embodiment, the electric circuit device may be substantially disk-shaped. Accordingly, the at least one side surface is exactly one side surface in this case, surrounding the perimeter of the disk. In another exemplary embodiment, the electric circuit device may be substantially cuboid. Accordingly, the at least one side surface is four side surfaces, connecting the respective edges of the substantially rectangular first and second main surfaces. In yet another embodiment, the electric circuit device may be substantially wedge-shaped. Accordingly, the at least one side surfaces is three side surfaces, with one of them being rectangular and the other two side surfaces being triangular. Many other shapes and geometries are also possible.

The term "disposed in the electric circuit device" does not imply that the power supply circuitry and the at least one heat transport element are arranged within the body of the electric circuit device, i.e. below the surface thereof. Instead, the term is intended to encompass both an arrangement on the surface of the electric circuit device and within the body of the electric circuit device. For example, in a particular embodiment, the power supply circuitry may be disposed on one or more surfaces of the electric circuit device, while the at least one heat transport element may be disposed within the body of the electric circuit device.

The term "heat exchange relationship" describes a coupling between the at least one LED and the at least one heat transport element in such a way that heat transport element(s) form a favorable path for the heat generated by the LED(s). In particular, the heat may leave the LED(s) via the heat transport element(s) over diffusing into the body of the electric circuit device in various directions.

The heat transport element(s) is/are heat sink element(s) for the at least one LED. In other words, the LED(s) release their waste heat to the heat transport element(s). The heat transport element(s), however, do not absorb the waste heat, but transport it to one or more places of the electric circuit device where the waste heat can be released efficiently into the environment and/or into other heat absorption structures.

According to a further embodiment, a lateral extension of each of the first main surface and the second main surface, measured in the directions of their respective smallest extensions, is at least 3 times, in particular at least 5 times, more in particular at least 10 times, the largest distance between the first main surface and the second main surface at the at least one side surface. In other words, the smallest dimension of any of the first main surface and the second main surface is at least 3 times as long as the largest extension of the at least one side surface from the first main surface to the second main surface. In the example of a rectangular cuboid with three different lengths a, b and c of the edges (a>b>c), the length b is at least 3 times the length c. In yet other words, when placed on a table by itself with the second main surface facing the table, the smallest length dimension of the first main surface is at least 3 times the height extension of the at least one side surface. In this way, the electric circuit device is particularly flat, allowing for a high integration of such electric circuit devices.

According to a further embodiment, the electric circuit device integrates the power supply circuitry and the at least one heat transport element in three dimensions. In this way, the power supply circuitry and the at least one heat transport element are not constrained from crossing, as is the case in printed circuit boards. The crossing may take place in different layers of the electric circuit device. For example, the power supply circuitry may be routed on one or both of the first and second main surfaces, while the at least one heat transport element may be routed through the interior of the electric circuit device. In a particular embodiment, the paths of the power supply circuitry and the at least one heat transport element may cross, when projected onto each other in a viewing direction perpendicular to the main surfaces.

According to a particular embodiment, the electric circuit device may be a three-dimensional electronic circuit. It is also possible that the electric circuit device may be a structure similar to a printed circuit board, with the electric circuits disposed on one or both of the first and second main surfaces, with the heat transfer element(s) being disposed in the inside of the structure. According to a particular embodiment, the first main surface may comprise a positive terminal and the second main surface may comprise a negative terminal for power supply.

According to a further embodiment, the at least one heat transport element is at least one wire or at least one plate, in particular a metallic wire or plate, more in particular a silver or copper wire or plate. The wire or plate may also be made from other materials, for example alloys. Wires or plates have a large heat transfer capacity. They may be embedded into the electric circuit device in an electrically isolated manner, routing the waste heat from the LED(s) to desired release point(s) in the electric circuit device. The whole body and surface of the electric circuit device can be efficiently used for heat transport and heat release. The wire(s) or plate(s) may be coupled to an electrically isolated waste heat release point of the LED(s). Alternatively, the wire(s) or plate(s) themselves may have an electrically isolated end for absorption of heat from the LED(s) without affecting their electric behavior. The plate(s) may provide a wide distribution of waste heat throughout the electric circuit device, resulting in particularly efficient waste heat transport. It is also possible that the at least one heat transport element is at least one channel, which may be open towards the environment. The heat may be routed from the LED(s) through the electric circuit device via the at least one channel to heat release point(s).

According to a further embodiment, the at least one heat transport element extends away from the at least one side surface in a substantially perpendicular direction. In this way, the waste heat is transported straight away from the side surface(s) of the LED(s). The direction of heat transfer allows for the waste heat to gain maximum distance with respect to the respective side surface where the LED in question is. In this way, said respective side surface can be freed from waste heat particularly efficiently. This again allows the usage of LED's with larger waste heat and/or for a larger integration of multiple LED's in close proximity on the side surface in question.

It is pointed out that is it is also possible that the direction of the at least one heat transport element may be inclined towards the first main surface or the second main surface or towards other side surfaces of the electric circuit device. Further, it is also possible that the heat transport element in question leaves the respective side surface in a particular direction, but is angled or bent in its later course through the electric circuit device. In particular, the at least one heat transport element may extend from the at least one side surface in a substantially perpendicular direction and may comprise a turn towards one of the first and second main surfaces.

According to a further embodiment, the at least one LED is glued, soldered or welded to the electric circuit device. In this way, a safe electric connection of the LED(s) is achieved, while ensuring a desired fixed heat exchange relationship between the at least one LED and the at least one heat transport element.

According to a further embodiment, the electric circuit device is a packaged electronic component. In this way, the electric circuit device can be handled easily during the assembly of the aircraft LED light unit. It is insensitive to at least low mechanical forces. The packaging may be the casing and/or isolation for the power supply circuitry and/or the at least one heat transport element. It is also possible that the electric circuit device is unpackaged. As the aircraft LED light unit commonly comprises a housing, the unpackaged electric circuit device is protected during use of the aircraft. The packaging of the electric circuit device is therefore not necessary.

According to a further embodiment, the at least one LED is a plurality of LED's. In a particular embodiment, the at least one heat transport element is a plurality of heat transport elements, each of which is associated with one LED. The number of heat transport elements may correspond to the number of LED's. However, it is also possible that the aircraft LED light unit has a plurality of LED's, with the waste heat of them being transferred away by one heat transport element. This single heat transport element may be a metallic plate, made from copper or silver or other materials or alloys. It is also possible that there are multiple heat transport elements, but less in number as compared to the number of LED's. Each heat transport element may then serve one or more LED's for waste heat transport.

According to a particular embodiment, the electric circuit device may have between 1 and 10 LED's. The 1 to 10 LED's may be arranged on exactly one side surface of the electric circuit device.

According to a particular embodiment, no LED may be provided on the first main surface and the second main surface of the electric circuit device. In other words, both the first and second main surfaces may be free of LED's. It is, however, also possible that one or more LED's are provided on the first main surface and/or the second main surface.

According to a further embodiment, the aircraft LED light unit comprises at least one optical element, comprising for example a lens and/or reflector and/or shutter, the at least one optical element being associated with the at least one LED for shaping an output light intensity distribution of the at least one LED. It is possible that one optical element may be provided for exactly one LED. It is also possible that one optical element may be associated with a plurality of LED's. Accordingly, when the aircraft LED light unit comprises multiple LED's, none or one or several optical elements may be provided. The optical element may be provided in a dedicated housing. In this way, the optical element can be assembled in an insensitive manner. The optical element(s) may comprise one or more lenses and/or one or more reflectors and/or one or more shutters. By combining these elements, elaborate light distribution shaping structures can be provided. In general, the additional optical element(s) allows for adapting the output light intensity distribution to particular application requirements. The inherent light intensity distribution of the LED(s) can be transformed into a desired light intensity distribution.

According to a further embodiment, the aircraft LED light unit further comprises a mechanical coupling mechanism that consists of a first coupling part, associated with the at least one optical element, and a second coupling part, comprised in the electric circuit device, wherein the first coupling part and the second coupling part are adapted to allow for a snapping on of the at least one optical element with respect to the electric circuit device. The snapping on may also be referred to as clipping on of the at least one optical element. The snapping on may be releasable or permanent. The at least one optical element may also be mounted to the electric circuit device in other ways, such as via a screw or a bolt or via gluing. The provision of originally separate optical element(s) allows for an easy adaptation of the output light intensity without adaptation of the electric circuit device. Accordingly, the electric circuit device may be designed independent from the particular application scenario. Also, such additional optical elements are often readily available for certain transformations of light intensity distributions, making the design process of new aircraft LED light units fast.

According to a further embodiment, the aircraft LED light unit further comprises an additional flat electric circuit device, the additional flat electric circuit device being stacked vertically with the electric circuit device and also comprising power supply circuitry, at least one heat transport element and at least one LED. The additional flat electric circuit device may have a design identical to the electric circuit device described above. In other words, the additional flat electric circuit device may have a first main surface, a second main surface and at least one side surface extending between the first main surface and the second main surface. Power supply circuitry and at least one heat transport element may be disposed in the additional electric circuit device. Further, at least one LED may be arranged on the at least one side surface of the additional electric circuit device, may be electrically coupled to the power supply circuitry, and may be in heat exchange relationship with the at least one heat transport element.

The electric circuit device, described above, and the additional electric circuit device, described in the preceding paragraph, may be referred to as the first and second electric circuit devices. The second electric circuit device may have the same modifications, discussed above with respect to the first electric circuit device. Also, more than two electric circuit devices may be provided. In particular, three, four, five or more electric circuit devices may be provided in the aircraft LED light unit. Providing multiple electric circuit devices allows for making efficient use of the aircraft LED light unit volume and achieving a wide variety of light intensity distributions.

According to a particular embodiment, the aircraft LED light unit may have between 25 and 100 LED's, distributed over a plurality of flat electric circuit devices.

Stacking the multiple electric circuit devices vertically means arranging the electric circuit devices in such a way that one of the first and second main surfaces of one electric circuit device faces one of the first and second main surfaces of an adjacent electric circuit device. In this way, the LED's on the side surfaces may have different principal emission directions, illuminating a wide range around the aircraft LED light unit. However, it is also possible that the electric circuit devices are arranged at other angles, including right angles, with respect to each other, resulting in more degrees of freedom for achieving desired three-dimensional light distribution characteristics.

According to a further embodiment, the aircraft LED light unit further comprises a flat control circuit device, the flat control circuit device being stacked vertically with the electric circuit device and comprising control circuitry adapted to control the at least one LED of the electric circuit device. By separating the control circuitry from the electric circuit device(s), the electric circuit device(s) may be freed from ancillary circuitry, leaving more room for heat transfer purposes and further enhancing the potential LED integration density. Also, the control circuitry of multiple electric circuit devices may be combined into a single control circuit device. The LED driver circuitry may also be provided in the control circuit device. However, it is also possible that the LED driver circuitry may be provided in the electric circuit device(s) itself/themselves.

According to a further embodiment, the aircraft LED light unit further comprises a flat heat transport device, comprising at least one heat transport element, wherein the flat heat transport device has no electric connections and is adapted to be coupled horizontally to the electric circuit device, with the at least one heat transport element of the heat transport device configured to be coupled to the at least one heat transport element of the electric circuit device. In this way, dedicated heat transport capacity may be added to the electric circuit device, which is entirely independent from the power supply circuitry. Accordingly, no electric constraints at all must be fulfilled in the heat transport device. The term "horizontal" stacking refers to an adjacent placing of respective side surfaces.

According to a further embodiment, the aircraft LED light unit is an interior aircraft light or an exterior aircraft light. The achieved space and weight savings are valuable in general in the aircraft industry, given the low available space and the fuel required for lifting the weight. In the exterior of the aircraft, reduced space also leads to aerodynamic advantages.

Exemplary embodiments of the invention further include an aircraft, such as an air plane or a helicopter, comprising at least one aircraft LED light unit, as described in any of the embodiments above, disposed on an inside and/or an outside of the aircraft. Above modifications and advantages, described with respect to the aircraft LED light unit, equally apply to the aircraft.

BRIEF DESCRIPTION OF THE DRAWINGS

Embodiments of the invention are described in greater detail below with reference to the figures, wherein.

DETAILED DESCRIPTION

Figure 1:
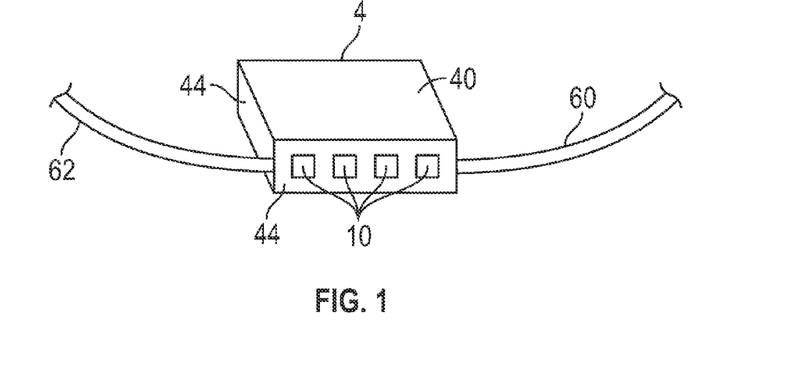
FIG. 1 shows a packaged electric circuit device with 4 LED's, as used in an exemplary embodiment of an aircraft LED light unit in accordance with the invention.

FIG. 1 shows an electric circuit device with four LED's for use in an aircraft LED light unit in accordance with an exemplary embodiment of the invention. The electric circuit device 4 is a flat, three-dimensional structure. It is a packaged component and is therefore shown as a solid structure in the drawing of FIG. 1. The electric circuit device 4 has a first main surface 40, a second main surface (not shown due to the viewing direction of FIG. 1), and four side surfaces 44, two of which are shown in the viewing direction of FIG. 1.

One of the side surfaces 44, namely the side surface shown most prominently in the viewing direction of FIG. 1, holds four LED's 10. The LED's 10 are partially integrated into the packaged electric circuit device 4, with the light emission portions protruding from the electric circuit device 4. The four LED's 10 are distributed in an equidistant manner across the side surface 44 facing the viewer of FIG. 1. They are placed adjacent to each other with a distance between them that is similar to the cross-sectional extension of the light emission portions.

FIG. 1 further shows two power supply lines 60 and 62. The two power supply lines 60, 62 are two power supply terminals, with the power supply line 60 supplying a positive voltage and the power supply line 62 supplying a negative voltage. It is pointed out that the voltages of the power supply lines 60 and 62 do not need to be positive and negative on an absolute scale. They need to provide a voltage drop from the power supply line 60 to the power supply line 62 for allowing the electric circuit device 4 to function and to provide power to the four LED's 10.

Figure 2:
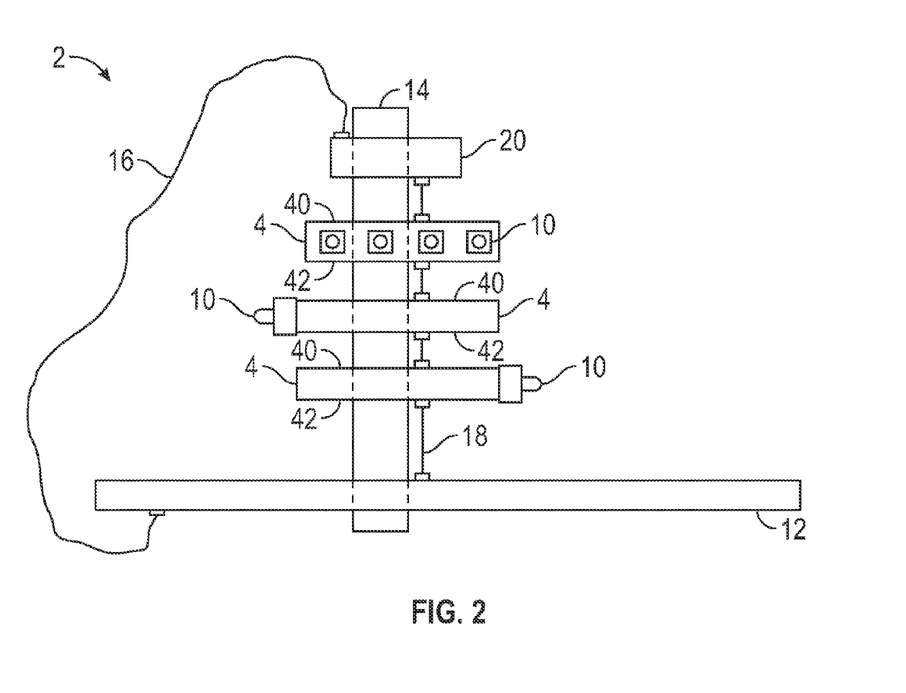
FIG. 2 shows a schematic diagram of an exemplary embodiment of an aircraft LED light unit in accordance with the invention, having multiple electric circuit devices with LED's.

FIG. 2 shows a schematic diagram of an aircraft LED light unit 2 in accordance with an exemplary embodiment of the invention. The aircraft LED light unit 2 is shown without a housing that is commonly provided for protection of the components of the aircraft LED light unit 2. The housing is omitted for a better illustration of the remaining components.

The aircraft LED light unit 2 comprises a mounting plate 12 and a mounting pole 14. Three electric circuit devices 4, each of which is embodied in almost the same way as the electric circuit device 4 of FIG. 1, are mounted on the mounting pole 14. The electric circuit devices 4 are arranged on the mounting pole 14 in such a way that respective main surfaces of the electric circuit devices 4 face each other. This arrangement of the electric circuit devices 4 is also referred to as a stack of electric circuit devices. In particular, it is referred to as a "vertical" stack of electric circuit devices 4, because placing one of the electric circuit devices 4 by itself on a table and placing the other electric circuit devices 4 with facing main surfaces on top thereof would result in a vertical stacking of these components. The electric circuit devices 4 are mounted to the mounting pole 14 via mounting holes in the centers thereof. The mounting holes extend through the bodies of the electric circuit devices 4 from the first main surface to the second main surface, respectively. The electric circuit devices 4 are mounted to the mounting pole 14 in a spaced apart manner. In the particular embodiment of FIG. 2, the electric circuit devices are spaced apart by about the same distance as their height, i.e. as their extension of the side surfaces.

The power for the electric circuit devices 4 is supplied from the mounting plate 12 via power supply lines 16 and 18. The power supply line 16 connects the lower side of the mounting plate 12, which is at a positive potential, to the upper side of a control circuit device 20, which will be described below. The power supply line 18 has four individual sections. The first section connects the lower side of the control circuit device 20 to the upper surface 40 of the top most electric circuit device 4. The second section connects the lower surface 42 of the top most electric circuit device 4 to the upper surface 40 of the middle electric circuit device 4. The third section connects the lower surface 42 of the middle electric circuit device 4 to the upper surface of the lowest electric circuit device 4. The fourth section connects the lower surface 42 of the lowest electric circuit device 4 to the upper surface of the mounting plate 12, which is at a negative potential. In this way, a voltage drop from the lower surface of the mounting plate 12 through the control circuit device 20 and the three electric circuit devices 4 to the upper surface of the mounting plate 12 is established.

The respective upper and lower surfaces of the electric circuit devices 4 are conductive plates. In this way, the power supply circuitry of all of the electric circuit devices 4 is comprised of respective conductive coatings on the upper side and the lower side. Each of the electric circuit devices 4 has four LED's 10. In this way, the electric circuit devices 4 correspond to the electric circuit device 4 of FIG. 1, which also supports four LED's 10. The LED's of the different electric circuit devices 4 are oriented in different directions. The four LED's 10 of the top most electric circuit device 4 face the viewer of FIG. 2. The four LED's 10 of the electric circuit device 4, disposed in the middle, have their principal light emission direction to the left in the viewing direction of FIG. 2. The LED's 10 of the lowest electric circuit device 4 have their principal light emission direction towards the right in the viewing direction of FIG. 2. In this way, an aircraft LED light unit is provided that has high illumination capacity in three directions. As is apparent, the stacking and orienting of the electric circuit devices 4 allows for a wide variety of light emission distributions.

All of the LED's 10 are coupled to the respective upper surfaces 40 with one of their terminals and to the respective lower surfaces 42 with the other one of their terminals. In this way, a conductive path through the LED's 10 is established that may provide electrical power to the LED's 10 without any further dedicated driving circuitry within the electric circuit devices 4.

As can be seen from FIG. 2, the LED's 10 are mounted to respective side surfaces 44 of the electric circuit devices 4. In this way, the LED's 10 can make use of the whole bodies of the electric circuit devices 4 for the waste heat transport. This in turn allows for the high integration of the LED's 10 in the aircraft LED light unit 2. Each of the LED's 10 is provided with a heat transport element that runs through the body of the respective electric circuit device 4. As the heat transport elements are disposed within the electric circuit devices 4, they are not shown in the outside view of FIG. 2. Their disposition and functioning will be described with respect for FIG. 4 below.

The aircraft LED light unit 2 of FIG. 2 further has the control circuit device 20, which is also mounted to the mounting pole 14. As discussed above, the control circuit device 20 is supplied with electrical power by the power supply lines 16 and 18. The control circuit device 20 comprises control and driver circuitry, receiving illumination commands and providing the LED's 10 with desired voltage and current levels, as a response to the illumination commands. Placing the control and driver circuitry in a dedicated control circuit device 20 allows for keeping the circuitry in the electric circuit devices 4 to a minimum, leaving the bulk of the available volume for waste heat transfer and allowing a particularly high LED intensity.

However, it is also possible to alter this approach. For example, the control circuit device 20 may comprise the control circuitry, while respective driver circuits are comprised in the electric circuit devices 4. It is further possible that the electric circuit devices 4 are controlled individually by the control circuit device 20, resulting in illumination of certain directions only. In this way, the aircraft LED light unit 2 and its control circuit device 20 may allow for various different illumination modes.

It is pointed out that the portion of the electric circuit device 4, covered with the power supply circuitry 6, and the portion of the electric circuit device 4, not covered with the power supply circuitry 6, may be originally separate elements, which are coupled to each other. Such a coupling along the side surfaces is also referred to as horizontal coupling.

Figure 3:
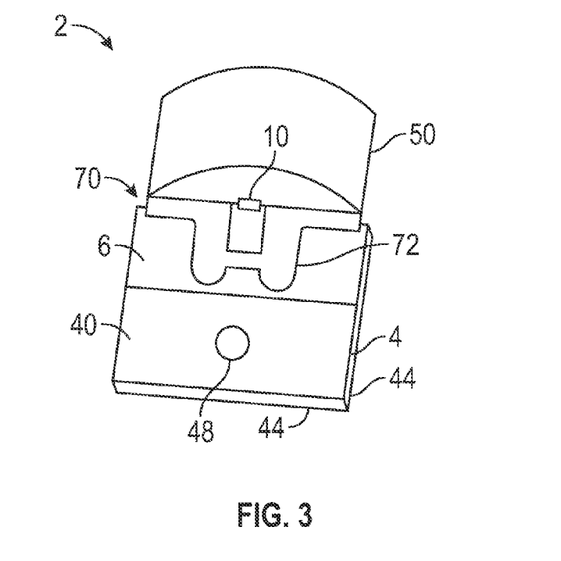
FIG. 3 shows another exemplary embodiment of an aircraft LED light unit in accordance with the invention, with the electric circuit device being coupled to an optical element.

FIG. 3 shows a perspective top view of an aircraft LED light unit 2 in accordance with another exemplary embodiment of the invention. FIG. 3 shows an electric circuit device 4, to which a single LED 10 is mounted. For an easier intelligibility, the mounting plate, mounting pole, and light unit housing are omitted from FIG. 3. In the viewing direction of FIG. 3, the first main surface 40 or upper surface 40 of the electric circuit device is shown. Additionally, two of the four side surfaces 44 can be seen. The electric circuit device 4 comprises a mounting hole 48 for being mounted to a mounting pole, such as the mounting pole 14 of FIG. 2.

The power supply circuitry 6 is comprised of two conductive surfaces, one of which is shown in the viewing direction of FIG. 3. This one conductive surface covers about half of the first main surface 40 of the electric circuit device 4.

The aircraft LED light unit 2 further comprises an optical element 50. This optical element 50 is comprised of a housing, a lens, which forms the end of the housing on one side, and a first coupling part 72. The first coupling part 72 and a second coupling part, comprised in the electric circuit device 4, form a coupling mechanism 70. The second coupling part cannot be seen in the viewing direction of FIG. 3, as it is covered by the first coupling part 72 of the optical element 50. As will be described with respect to FIG. 4, the coupling mechanism 70 allows for a snapping on of the optical element 50 onto the electric circuit device 4.

The optical element 50 has a substantially cylindrical housing, which is arranged around the LED 10. The light emitted from the LED 10 travels through this cylindrical housing and hits the lens of the optical element 50, disposed at the end of the cylindrical housing. The lens shapes the output light distribution of the LED 10. In this way, desired light intensity distributions can be achieved with easily implementable snap-on technology.

Figure 4:
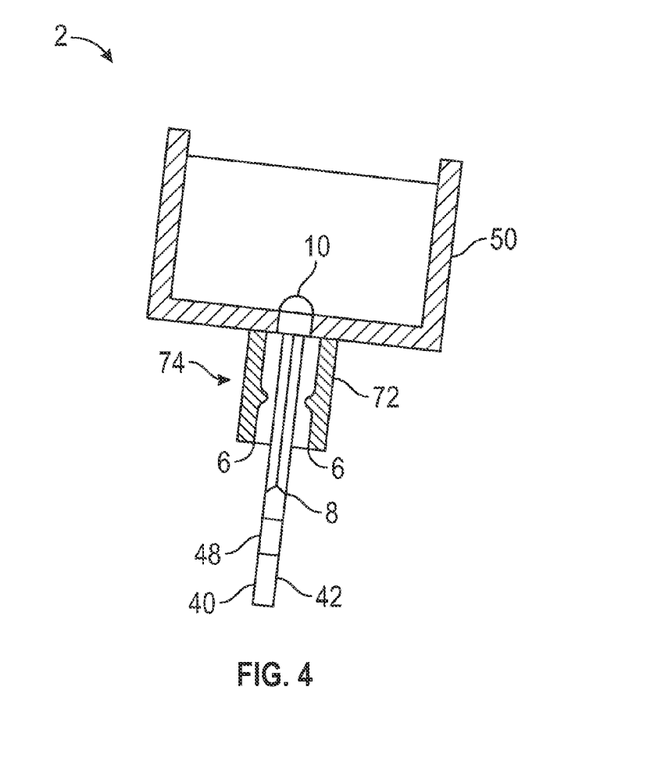
FIG. 4 shows a cross-section through the exemplary embodiment of FIG. 3.

FIG. 4 shows a cross-section through the aircraft LED light unit 2 of FIG. 3. The cross-sectional plane is a plane perpendicular to the first main surface 40 of the electric circuit device 4, going through the LED 10. It can be seen from FIG. 4 that the electric circuit device 4 has two conductive surfaces, forming the power supply circuitry 6. These two conductive plates cover a portion of the first main surface 40 and of the second main surface 42, respectively. The LED 10 is in electrical contact with both conductive plates for receiving electrical power.

This cross-section through the aircraft LED light unit 2 shows the heat transport element 8, associated with the LED 10. The heat transport element 8 is a copper wire in the exemplary embodiment of FIG. 4. It may be made of other materials, such as silver, as well as of metallic alloys. The copper wire 8 has a first end in close proximity to the LED 10. It is in thermal exchange relationship with the lower end of the LED 10. There, the wire 8 absorbs waste heat, generated by the LED 10 in use, and transports said waste heat through the electric circuit device 4 away from the LED 10. The copper wire 8 has a second end in the first main surface 40 between the conductive plate and the mounting hole 48. The copper wire 8 may have the second end in a variety of other positions in the electric circuit device 4, depending where heat release points are desirable. It is also possible that a heat transfer plate, made of materials such as copper and silver, extends through a large portion of the electric circuit device 4.

As can be seen in FIG. 4, the first coupling part 72 has a ridge running along an inner surface of the first coupling part 72. The second coupling part 74 comprises two groves in the first and second main surfaces 40, 42. The optical element 50 may be pushed over the electric circuit device 4, resulting in a locking of the position of the ridges in the groves, which locks the position of the optical element with respect to the electric circuit device 4.

Numerous modifications may be made with respect to the exemplary embodiments described herein. For example, it is possible that the electric circuit device 4 does not have power supply circuitry on its surfaces. Instead, the power supply circuitry may be disposed within the body of the electric circuit device 4.

Also, the coupling mechanism 70 may have a variety of different forms. For example, the first coupling part 72 may have a hook shape, which can be pushed onto a bar-shaped second coupling part 74. In this way, a coupling via mechanical snapping-on of the optical element 50 can be achieved as well.

Figure 5A:
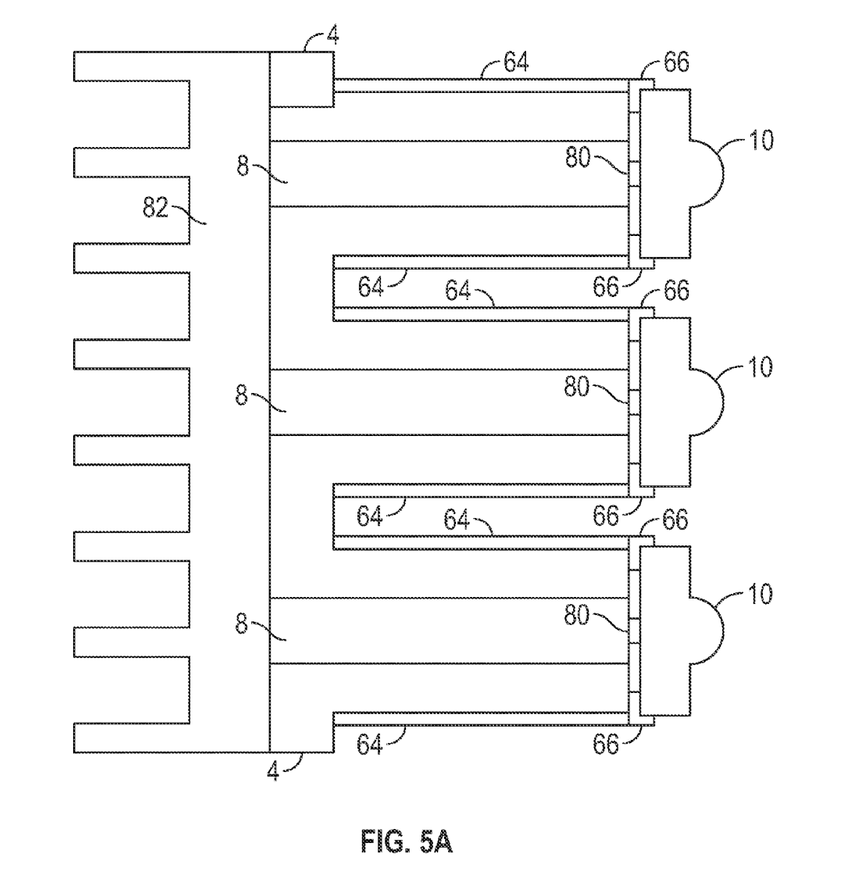
FIG. 5a shows several components of another exemplary embodiment of an aircraft LED light unit in accordance with the invention.

FIG. 5a shows a cross-section through an exemplary electric circuit device 4, as used in an aircraft LED light unit in accordance with another exemplary embodiment of the invention. The cross-sectional plane of FIG. 5a is in parallel with the first and second main surfaces of the electric circuit device 4, which first and second main surfaces are therefore not shown in FIG. 5a.

The electric circuit device 4 supports three LED's 10. Each of the LED's 10 is coupled to two power supply contacts 64, also referred to as electrical traces, via respective solder joints 66. The power supply contacts 64 form the power supply circuitry disposed in the electric circuit device 4. The power supply contacts 64 are provided along the electric circuit device 4. The electric circuit device 4 is made mainly of a dielectric material for isolating the power supply contacts 64 with respect to each other.

For each of the LED's 10, a respective heat transport element 8 is provided, which extends through the electric circuit device 4. The heat transport elements 8 are metallic wires. On the one end, the heat transport elements 8 are in heat exchange relationship with the slugs of the LED's via solder joints 80. On the other end, the heat transport elements 8 are coupled to a heat sink structure 82. The heat sink structure 82 absorbs the heat from the heat transport elements 8 and releases the heat into the ambient air or other gas, provided in the aircraft LED light unit. For this purpose, the heat sink structure 82 has a plurality of fins, which increase the surface area available for heat transfer with the ambient gas.

Figure 5B:
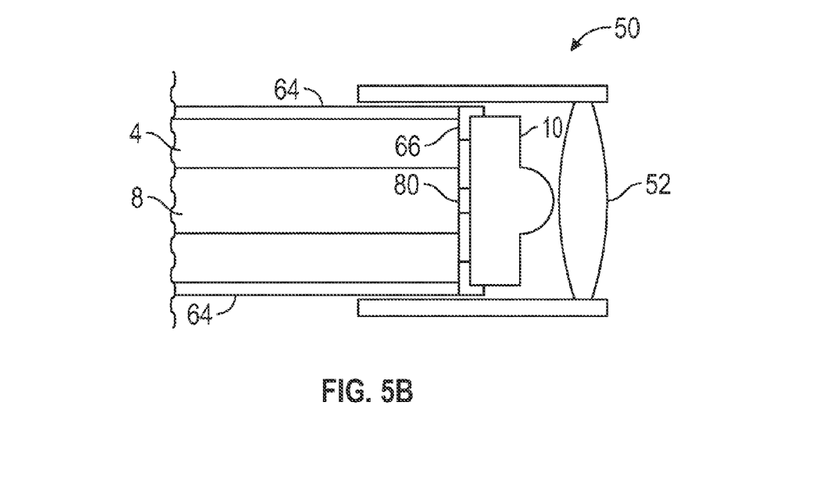
FIG. 5b shows a portion of the components shown in FIG. 5a, with the LED being coupled to an optical element.

FIG. 5b shows a portion of the electric circuit device 4 and one of the LED's 10 of FIG. 5a, together with its solder joints 66, 80, its power supply contacts 64 and its heat transport element 8. A description of said elements is not repeated for brevity.

FIG. 5b additionally shows an optical element 50. The optical element 50 has a lens 52, which is supported by a supporting structure, which is represented by two bars in the cross-sectional view of FIG. 5b. The optical element 50 can be clipped onto the electric circuit device 4 via a coupling mechanism. This coupling mechanism may have various different forms. In particular, the coupling mechanism may provide an engagement of the optical element 50 with the first and second main surfaces of the electric circuit device 4. Accordingly, the clipping means cannot be seen in the cross-sectional plane of FIG. 5b. The lens 52 of the exemplary embodiment of FIG. 5b is a convex lens, which converges the light emitted from the LED 10. Other lenses are equally possible, depending on the particular application of the aircraft LED light unit.

While the invention has been described with reference to exemplary embodiments, it will be understood by those skilled in the art that various changes may be made and equivalence may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiments disclosed, but that the invention will include all embodiments falling within the scope of the appended claims.

The invention claimed is:
1. An Aircraft LED light unit comprising:
  a flat, substantially cuboid electric circuit device having a first main surface, a second main surface and four side surfaces extending between the first main surface and the second main surface at respective circumferential portions of the first main surface and the second main surface,
  power supply circuitry, disposed in the electric circuit device,
  at least one heat transport element, disposed in the electric circuit device, and
  a plurality of LEDs, wherein the plurality of LEDs are arranged adjacent to each other along a first side surface of the four side surfaces of the electric circuit device, are electrically coupled to the power supply circuitry, and are in heat exchange relationship with the at least one heat transport element
  wherein the electric circuit device is a packaged electronic component, forming a casing for the power supply circuitry and the at least one heat transport element, and wherein the plurality of LEDs are at least partially integrated into the packaged electronic component.

2. The Aircraft LED light unit according to claim 1, wherein a lateral extension of each of the first main surface and the second main surface, measured in the directions of their respective smallest extensions, is at least 3 times, in particular at least 5 times, the largest distance between the first main surface and the second main surface at the at least one side surface.

3. The Aircraft LED light unit according to claim 1, wherein the electric circuit device integrates the power supply circuitry and the at least one heat transport element in three dimensions.

4. The Aircraft LED light unit according to claim 1, wherein the at least one heat transport element is at least one wire or at least one plate, in particular a silver or copper wire or plate.

5. The Aircraft LED light unit according to claim 1, wherein the at least one heat transport element extends away from the at least one side surface in a substantially perpendicular direction.

6. The Aircraft LED light unit according to claim 1, wherein the at least one LED is glued, soldered or welded to the electric circuit device.

7. The Aircraft LED light unit according to claim 1, further comprising at least one optical element, such as a lens or reflector or shutter, associated with the at least one LED for shaping an output light intensity distribution of the at least one LED.

8. The Aircraft LED light unit according to claim 7, further comprising a mechanical coupling mechanism that consists of a first coupling part, associated with the at least one optical element, and a second coupling part, comprised in the electric circuit device, wherein the first coupling part and the second coupling part are adapted to allow for a snapping on of the at least one optical element with respect to the electric circuit device.

9. The Aircraft LED light unit according to claim 8, further comprising an additional flat electric circuit device, the additional flat electric circuit device being stacked vertically with the electric circuit device and also comprising power supply circuitry, at least one heat transport element and at least one LED.

10. The Aircraft LED light unit according to claim 1, further comprising a flat control circuit device, the flat control circuit device being stacked vertically with the electric circuit device and comprising control circuitry adapted to control the at least one LED of the electric circuit device.

11. The Aircraft LED light unit according to claim 1, further comprising a flat heat transport device, comprising at least one heat transport element, wherein the flat heat transport device has no electric connections and is adapted to be coupled horizontally to the electric circuit device, with the at least one heat transport element of the heat transport device configured to be coupled to the at least one heat transport element of the electric circuit device.

12. The Aircraft LED light unit according to claim 1, wherein the aircraft LED light unit is an interior aircraft light or an exterior aircraft light.

13. The Aircraft, such as an airplane or a helicopter, comprising at least one aircraft LED light unit according to claim 1, disposed on an inside or an outside of the aircraft.

* * * * *